Figure 1:
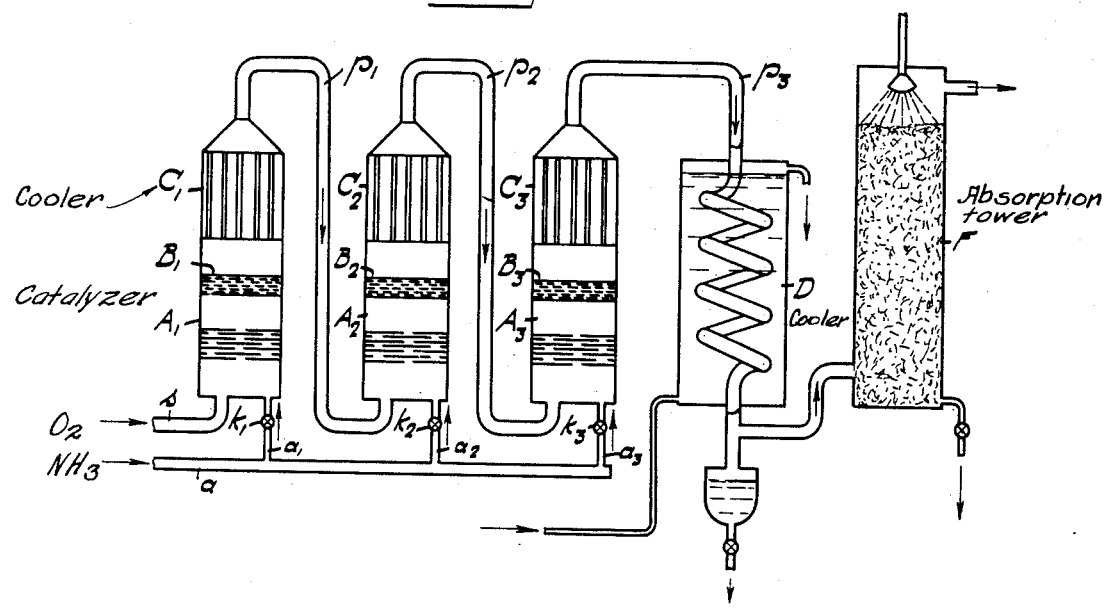

Patented Jan. 21, 1930

1,744,652

UNITED STATES PATENT OFFICE

FRANS GEORG LILJENROTH, OF STOCKHOLM, SWEDEN

METHOD OF OXIDIZING AMMONIA

Application filed January 11, 1926, Serial No. 80,544, and in Sweden January 29, 1925.

This invention relates to an improved process of oxidizing ammonia.

In oxidizing ammonia into nitric acid atmospheric air is usually used as oxidizing agent. Said method has the drawback that the nitric oxide primarily formed becomes highly diluted by the nitrogen of the air which makes it necessary to use large and expensive absorption systems for converting the nitric oxide into nitric acid and, furthermore, the nitric acid produced will be rather weak.

It has also been proposed to substitute air enriched with oxygen or even pure oxygen for the atmospheric air in such oxidizing process. This proposal is very attractive when the ammonia is produced by means of hydrogen which has been produced electrolytically inasmuch as in such case oxygen in large quantities is obtained without special cost and otherwise would be practically worthless. By such process a too large dilution of the nitric oxide formed by the atmospheric nitrogen is avoided, but on the other hand the drawback arises that the heat of reaction formed in oxidizing the ammonia into nitric oxide and water causes a very much greater rise of temperature in comparison with the use of atmospheric air, dependent thereon that the gas quantity present at the reaction is much smaller when the oxidation is carried out with the equivalent quantity of pure oxygen than if the same quantity of oxygen is accompanied by a four times greater quantity of nitrogen as is the case when atmospheric air is used. On account of the high temperature of reaction resulting in using pure or practically pure oxygen for the oxidation the speed of reaction is increased in such degree that the reaction takes place as an explosion and the method has, therefore, hitherto been unpracticable.

The above statements are easily understood from a comparison between the reaction conditions in using atmospheric air on the one hand and pure oxygen on the other hand in oxidizing ammonia. In the former case the reaction will be as follows:

(1) $NH_3 + 2O_2 + 8N_2 = 1.5H_2O + NO + 0.75O_2 + 8N_2 + 52000$ cal.

in the latter case the reaction will be (2) $NH_3 + 2O_2 = 1.5H_2O + NO + 0.75O_2 + 52000$ cal.

In the former case the number of gas molecules will be 11.25 and as the molecular heat is about 7.5 the rise of temperature will be when 10% losses are assumed:

$$t_1 = \frac{52000 \times 0.9}{11.25 \times 7.5} = 560° \text{ C.}$$

If the temperature of the incoming gas mixture is 20° C. the temperature in the catalyst (which in well-known manner can consist of a platinum wire net, platinum asbestos, iron oxide and so on) will be about 580° C. which temperature is sufficiently low for preventing an explosion-like progress of the reaction.

If on the other hand pure oxygen is used for the oxidation the number of gas molecules formed will be 3.25 only and the rise of temperature will therefore under the same suppositions be in this case:

$$t_2 = \frac{52000 \times 0.9}{3.25 \times 7.5} = 1930° \text{ C.}$$

and accordingly the temperature of the catalyst will be about 1950° C. At said high temperature the reaction would take place explosion-like, the catalyst would be destroyed and the nitric oxide formed be decomposed to an essential degree into free nitrogen and free oxygen. It is true that the said drawbacks can be avoided by using a large excess of oxygen but in such case it would not be possible to attain any advantages as to the size of the absorption system or the strength of the acid produced.

The chief object of the present invention is to make it possible to use pure oxygen or a gas mixture consisting chiefly of oxygen for the oxidation of ammonia while avoiding the abovementioned draw-backs of a too high reaction temperature and while attaining the advantages as to the size of the absorption system and the strength of the nitric acid produced which may be reached when the nitric oxide formed is not too much diluted by inert gases.

The invention consists, chiefly, in performing the oxidation of the ammonia stepwise while using intermediate cooling. In this manner the effect is obtained that for the total rise of temperature which in using pure oxygen as oxidizing agent was above calculated to about 1930° C., a number of minor rises of temperature are substituted, which by the intermediate cooling are reduced to suitable values so that the temperature obtained after each step of reaction always is maintained at such low value that the duration of the catalyst is not jeopardized and the decomposition of the nitric oxide formed is essentially prevented.

The stepwise oxidation of the ammonia by means of oxygen can be effected either in such manner that to the quantity of oxygen necessary for the oxidation is added the corresponding quantity of ammonia in a plurality of successive portions, each portion of ammonia being oxidized and the resulting gas mixture being cooled before the next portion of ammonia is added, or in the inverse manner so that to the quantity of ammonia to be oxidized the corresponding quantity of oxygen is added in several portions, each portion of the oxygen being consumed for the oxidation and the resulting gas mixture being cooled before the next portion of oxygen is added.

Figure 2:
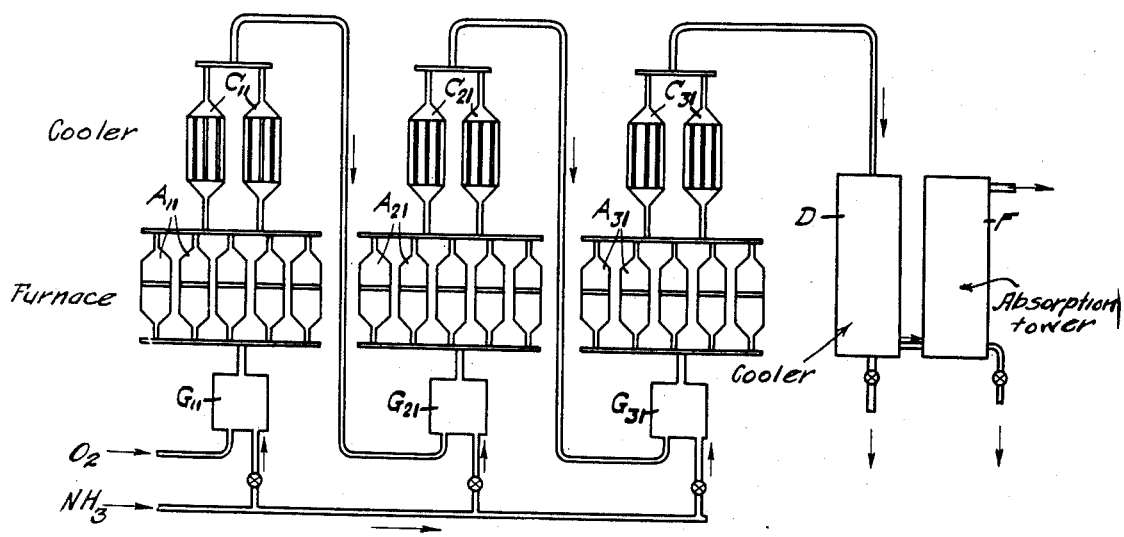

In the accompanying drawings I have shown diagrammatically in Figs. 1 and 2 two embodiments of apparatus adapted for the carrying out of the method.

Referring now to Fig. 1, the apparatus shown is adapted for a stepwise oxidation of the ammonia in such manner that about one third of the ammonia is supplied each time and oxidized while using intermediate cooling. $A_1$ $A_2$ $A_3$ designate three furnaces adapted for oxidation of ammonia into nitric oxide and water, said furnaces containing in well known manner catalyzer beds $B_1$ $B_2$ and $B_3$ respectively. Closely to each furnace a cooler $C_1$ $C_2$ or $C_3$ respectively is provided, said cooler consisting for instance of a steam generator heated by the hot reaction gases so as to utilize the excess of heat contained in said gases. The whole quantity of oxygen necessary for the reaction is supplied to the furnace $A_1$ through the pipe $s$ while the ammonia is supplied through a main pipe $a$ and branch pipes $a_1$ $a_2$ and $a_3$ respectively each connected to one of the furnaces $A_1$ $A_2$ and $A_3$ respectively, the gas supply being regulated by means of valves $k_1$, $k_2$ and $k_3$ respectively in the desired manner, for instance in such manner that equal quantities of ammonia are supplied to all furnaces. From the cooler $C_1$ the cooled gas mixture is conveyed through a pipe $p_1$ to the lower part of the furnace $A_2$ and from the furnace $A_2$ the gas mixture is conveyed through the cooler $C_2$ and a pipe $p_2$ to the lower part of the furnace $A_3$. From the latter the gas mixture passes through the cooler $C_3$ and a pipe $p_3$ to a cooler $D$ of acid-proof material in which the gas is cooled about to room temperature and the nitric acid is more or less completely condensed. The remaining gases are then led into an absorption system $F$ which in well-known manner can consist of a tower filled with an acid-proof material in which weak nitric acid or water is caused to flow down and wherein the nitric oxide and the nitrous gases are converted into nitric acid by means of the oxygen and the water present in the gas mixture.

Under the circumstances described the reaction in the furnace $A_1$ takes place according to the formula $$1/3 NH_3 + 2O_2 = 1/2 H_2O + 1/3 NO + 1.58 O_2 + 17000 \text{ cal.}$$

and the rise of temperature in the furnace $A_1$ can be calculated to be

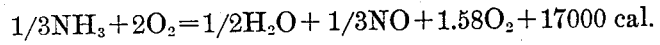

The temperature of the gas escaping from the furnace $A_1$ will thus be about 870° C. if the gas supplied to said furnace has a temperature of about 20° C. Said gas is then cooled in the cooler or steam generator $C_1$ to a temperature of for instance 350° C. It is not suitable to cool the gas too much as the nitric oxide then begins to take up oxygen and to be converted into nitrous gases which partly react with the ammonia to form ammonium nitrite, which in its turn is more or less fully decomposed into free nitrogen and water, partly react with the water present in the gas mixture to form nitric acid which attacks and destroys the apparatus.

By the addition of still 1/3 $NH_3$ of a temperature of about 20° C. to the gas mixture when it is led into the furnace $A_2$ the temperature is lowered to about 300° C. and at said temperature the gas mixture comes into contact with the catalyzer bed $B_2$. For this oxidation step the reaction formula will be $$1/3 NH_3 + 1/2 H_2O + 1/3 NO + 1.58 O_2 = H_2O + 2/3 NO + 1.16 O_2 + 17000 \text{ cal.}$$

and the rise of temperature will be

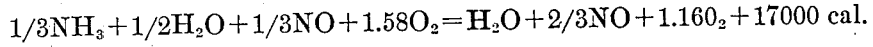

The gases escaping from the furnace $C_2$ have thus a temperature of about 1020° C.

Said gases are then cooled in the cooler $C_2$ to about 350° C. whereupon they are introduced into the furnace $A_3$ together with the last one third of the ammonia which has a temperature of about 20° C. The resulting gas mixture obtains a temperature of about 300° C. The oxidation in the furnace $A_3$ takes place according to the formula

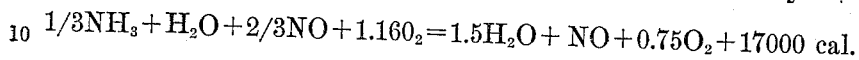

and the rise of temperature can be computed to be $$t_5 = \frac{17000 \times 0.9}{/1.5 + 1.0 + 0.75/ \times 7.5} = 630°\ C.$$

The gases escaping from the furnace $A_3$ will thus have a temperature of about 930° C. Said gases are cooled in the cooler $C_3$ to a temperature of for instance 250° C. and then in the cooler D as above mentioned to a temperature corresponding about to room temperature and are condensed in said cooler and in the absorption system F into nitric acid.

By adding the ammonia as above described and carrying out the oxidation thereof stepwise while cooling the gases after each step the temperature resulting from each oxidation step can be held below any desired value. The temperature should not at any step essentially exceed 1000° C. inasmuch as the loss by decomposition of the nitric oxide rapidly increases at temperatures above 1000° C. Generally, it is sufficient to carry out the reaction in three steps but it is, of course, also possible to use four, five or more steps and, if desired, also two steps only. It is, of course, not necessary or even desirable in using $x$ steps to supply exactly $\frac{1}{x}$ of the ammonia in each step. It is furthermore, not necessary to cool the gases after each step exactly to the same temperature. Generally, it is more suitable to distribute the ammonia somewhat unequally on the different steps and/or regulate the cooling after each step in such manner that the temperatures resulting after the several steps of reaction will be about equally high. The invention is, however, not limited thereto but covers also the cases in which different temperatures are used in the several steps. In the above example it was supposed that the ammonia was supplied stepwise to the whole quantity of oxygen, but it is also possible to supply the oxygen stepwise to the whole quantity of ammonia.

It was, furthermore, in the example above described supposed that the whole quantity of oxygen necessary for the oxidation of the ammonia into nitric oxide and water and the conversion of the nitric oxide into nitric acid was supplied already in the first oxidation step. This is, however, not necessary but it is also possible, if desired, to supply such quantity of oxygen only that is necessary for the oxidation of the ammonia into nitric oxide and water. In the latter case, I supply later, i. e. directly into the absorption system, the quantity of oxygen necessary for the complete oxidation of the nitric oxide into nitric anhydride ($N_2O_5$) or nitric acid ($HNO_3$). I prefer, however, to supply from the beginning, not only the quantity of oxygen necessary for the oxidation of the ammonia but also a small excess of oxygen for securing the whole quantity of nitric oxide being converted into nitric acid.

In a large plant consisting of many catalyzer furnaces the invention is, preferably, carried out as shown in Fig. 2. Also in this modification it is supposed that the oxidation is carried out in three steps, and that the ammonia is supplied stepwise while the oxygen is supplied in the first step in a sufficient quantity to oxidize the whole quantity of ammonia into nitric acid. For each oxidation step a battery of five furnaces $A_{11}$ $A_{21}$ $A_{31}$ connected in parallel is provided. Before each group of furnaces a mixing chamber $G_{11}$ $G_{21}$ or $G_{31}$ respectively is provided in which the ammonia supplied is mixed with the other gas before its introducing into the catalyzer furnaces. The coolers $C_{11}$ $C_{21}$ and $C_{31}$ are separated from the catalyzer furnaces and their number needs not be equal to the number of furnaces in each group but it suited to the requirements. The temperatures are regulated during the operation essentially in the same manner as described above with reference to Fig. 1. The cooler $D_1$ and the absorption system $F_1$ are or may be arranged in the same manner as in Fig. 1.

As the gas escaping from the oxidation plant consists essentially of a mixture of steam, nitric oxide and oxygen about in the proportions which are needed to produce nitric anhydride or nitric acid ($N_2O_5$ or $HNO_3$ respectively), the nitric acid is formed very rapidly in the cooler $D_1$ and the absorption system $F_1$ so that a rather small absorption system is sufficient and a highly concentrated nitric acid is obtained. By the provision of an intense cooling of the cooler $D_1$ it would even be possible to exclude the absorption system $F_1$.

What I claim is:

1. Method of oxidizing ammonia, which comprises adding ammonia stepwise to a gas consisting essentially of oxygen and reacting upon the added ammonia by means of the oxygen until the latter is practically consumed, the resulting gas mixture being cooled after each oxidation step.

2. Method of producing nitric acid, which comprises adding ammonia stepwise to a gas consisting essentially of oxygen, reacting upon the added ammonia by means of the oxygen while cooling the resulting gas mixture after each oxidation step, and finally condensing the resulting gas mixture into nitric acid.

3. Method of oxidizing ammonia, which comprises adding ammonia stepwise to a gas consisting essentially of oxygen in a quantity at least sufficient to oxidize all ammonia into nitric oxide and water, reacting upon each portion of added ammonia by means of the oxygen and cooling the resulting gas after each oxidation.

4. Method of producing nitric acid, which comprises adding ammonia stepwise to a gas consisting essentially of oxygen in a quantity at least sufficient to convert all ammonia into nitric acid, reacting upon each portion of added ammonia by means of the oxygen while cooling the resulting gas after each oxidation, and finally condensing the resulting gas mixture into nitric acid.

5. Method of oxidizing ammonia by means of a gas consisting essentially of oxygen, which comprises adding one of the gas components partaking in the reaction in portions to the other gas component, performing a reaction between such components after each addition, and cooling the resulting gas mixture after each oxidation step.

6. Method of oxidizing ammonia by means of a gas consisting essentially of oxygen, which comprises performing the reaction stepwise by adding one of the gas components partaking in the reaction in portions to the other gas component, and cooling the resulting gas mixture after each oxidation step, the quantities of added gas in each portion and the intermediate cooling being so suited that the reaction temperatures in all steps become practically equal.

7. Method of oxidizing ammonia by means of a gas consisting essentially of oxygen, which comprises performing the oxidation stepwise by adding one of the reaction components in portions before each reaction step, and cooling the resulting gas mixture after each oxidation step.

8. Method of oxidizing ammonia by means of a gas consisting essentially of oxygen, which comprises forming a gas mixture containing ammonia and oxygen, one of such reaction compounds being present in deficiency in relation to the other, performing the oxidation stepwise, cooling the resulting gas mixture after each oxidation step, and adding a fresh quantity of the reaction component present in deficiency before the oxidation is repeated.

9. Method of oxidizing ammonia, by means of a gas consisting essentially of oxygen, which comprises forming a gas mixture of said reaction components containing ammonia in deficiency in relation to the oxygen, performing the oxidation stepwise, cooling the resulting gas mixture after each oxidation step, and adding a fresh quantity of ammonia to the reaction products before the oxidation is repeated.

10. Method of oxidizing ammonia, which comprises adding the ammonia in portions to a gas consisting essentially of oxygen, reacting upon the added ammonia by means of the oxygen at a temperature not essentially above 1000° C. and cooling the resulting gas mixture after each oxidation.

11. Method of producing nitric acid by oxidation of ammonia, which comprises adding the ammonia in portions to a gas consisting essentially of oxygen, reacting upon the added portions of ammonia by means of the oxygen at a temperature not essentially above 1000° C. while cooling the resulting gas mixture after each oxidation, and finally condensing the gas mixture resulting from the last oxidation step into nitric acid.

12. Method of producing nitric acid by oxidation of ammonia, which comprises adding the ammonia in portions to a gas consisting essentially of oxygen, reacting upon the added portions of ammonia by means of the oxygen while cooling the resulting gas mixture after each oxidation, adding oxygen to the gas mixture resulting from the last oxidation step, and condensing the mixture into nitric acid.

13. The method of producing nitric acid by oxidation of ammonia gas with substantially pure oxygen gas and a catalyst, which comprises adding portions of one of the gases to the total volume of the other gas and cooling the reaction gases and condensing nitric acid after the completion of the reaction with each portion, thereby maintaining the catalyst at a sufficiently low temperature to prevent explosive reaction.

In testimony whereof I have signed my name.

FRANS GEORG LILJENROTH.